United States Patent [19]

Hata et al.

[11] 4,006,722
[45] Feb. 8, 1977

[54] METHOD AND DEVICE FOR CLEANING GASES EXHAUSTED FROM MULTI-CYLINDER INTERNAL COMBUSTION ENGINE

[75] Inventors: Yoshitaka Hata, Fujisawa; Kenji Ikeura, Yokohama; Haruhiko Iizuka, Yokosuka, all of Japan

[73] Assignee: Nissan Motor Co., Ltd., Yokohama, Japan

[22] Filed: Jan. 31, 1975

[21] Appl. No.: 545,915

[30] Foreign Application Priority Data

May 16, 1974 Japan .............................. 49-54112

[52] U.S. Cl. .................... 123/124 A; 123/127; 123/124 R; 60/274
[51] Int. Cl.² ................................. F02M 23/04
[58] Field of Search .... 123/52 M, 52 MV, 198 DB, 123/198 F, 124 R, 127, 124 A; 60/274, 282, 301, 285, 279

[56] References Cited

UNITED STATES PATENTS

| | | | |
|---|---|---|---|
| 3,364,909 | 1/1968 | Mick | 123/124 R |
| 3,626,915 | 12/1971 | Nakajima | 123/124 B |
| 3,708,980 | 1/1973 | Truxell | 60/274 |
| 3,827,237 | 8/1974 | Linder | 60/274 |

*Primary Examiner*—Ronald H. Lazarus

[57] ABSTRACT

A rich air-fuel mixture is diluted with air and fed into half of the cylinders, the remaining cylinders being fed the undiluted mixture.

9 Claims, 4 Drawing Figures

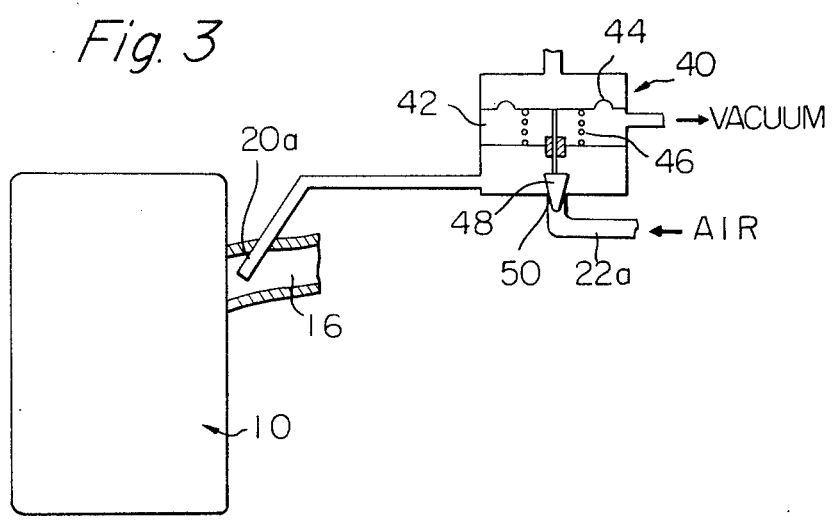
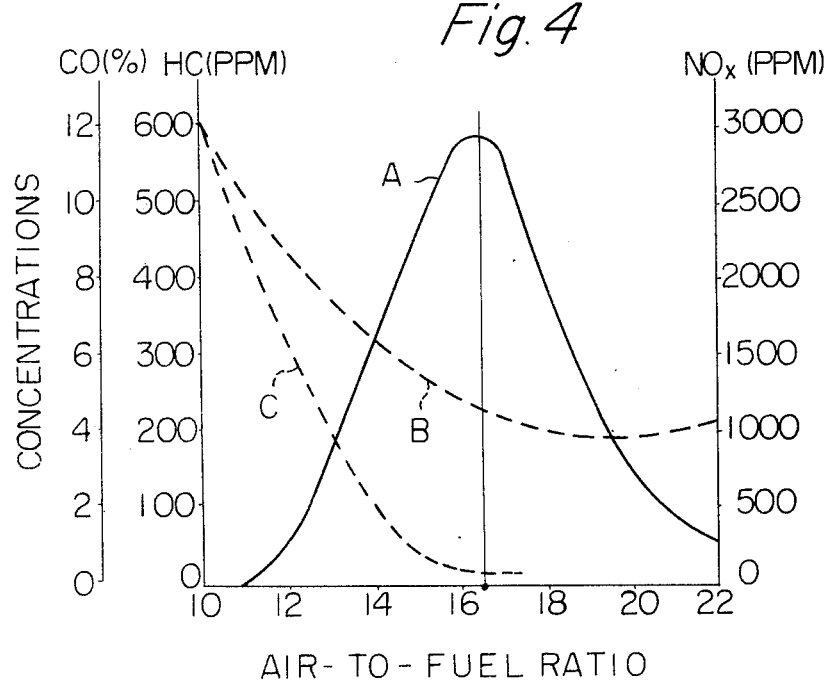

METHOD AND DEVICE FOR CLEANING GASES EXHAUSTED FROM MULTI-CYLINDER INTERNAL COMBUSTION ENGINE

The present invention relates to a method and device for operating a multi-cylinder internal combustion engine on air-fuel mixtures richer and leaner than the stoichiometric mixture.

As is well known in the art, the highest concentration of nitrogen oxides in the exhaust gases from the internal combustion engine results when the engine is operated on an air-fuel mixture of stoichiometric air-to-fuel ratio of 16:1. Accordingly the concentration of nitrogen oxides diminish when the air-to-fuel ratio of the air-fuel mixture is lower or higher than the stoichiometric air-to-fuel ratio or, in other words, the air-fuel mixture is rendered far richer or leaner. In view of this tendency, it has already been proposed that, for reduction of nitrogen oxides in the exhaust gases, a multi-cylinder internal combustion engine be operated on far richer air-fuel mixture supplied into half the number of total cylinders of the multi-cylinder engine and far leaner air-fuel mixture supplied into the remaining cylinders. Additionally, the engine is equipped with a thermal reactor wherein exhaust gases discharged from all the engine cylinders are mixed and reburned to reduce emission of noxious carbon monoxide and hydrocarbons into the atmosphere.

However, in the prior art, the multi-cylinder internal combustion engine is required to have two carburetors to feed thereinto far richer and far leaner air-fuel mixtures, respectively, and two sets of intake manifolds therefor. This inevitably results in complexity in production and high cost of the product.

It is, therefore, a principal object of the present invention to provide an improved method and device to reduce noxious constituents such as nitrogen oxides, carbon monoxide and hydrocarbons in exhaust gases issued from an internal combustion engine before emission into the atmosphere.

It is another object of the present invention to provide an improved method for feeding air-fuel mixtures both richer and leaner than the stoichiometric mixture into an internal combustion engine and a device for carrying out the method, the device being simple and inexpensive in construction.

It is still another object of the present invention to provide an improved method and device therefor capable of feeding, by using only one carburetor, air-fuel mixtures both richer and leaner than the stoichiometric mixture into an internal combustion engine.

Other objects and features of the improved method and device according to the present invention will be more apparent from the following description taken in conjunction with the accompanying drawings in which:

FIG. 3 is a schematic section view showing a pressure responsive valve controlling supplemental air feed into an internal combustion engine;

FIG. 4 is a graph showing typical examples of the relationship between the concentrations of nitrogen oxides, hydrocarbons and carbon monoxide in the exhaust gases from an internal combustion engine and the air-fuel ratios of the mixtures fed to the engine.

Figure 1:
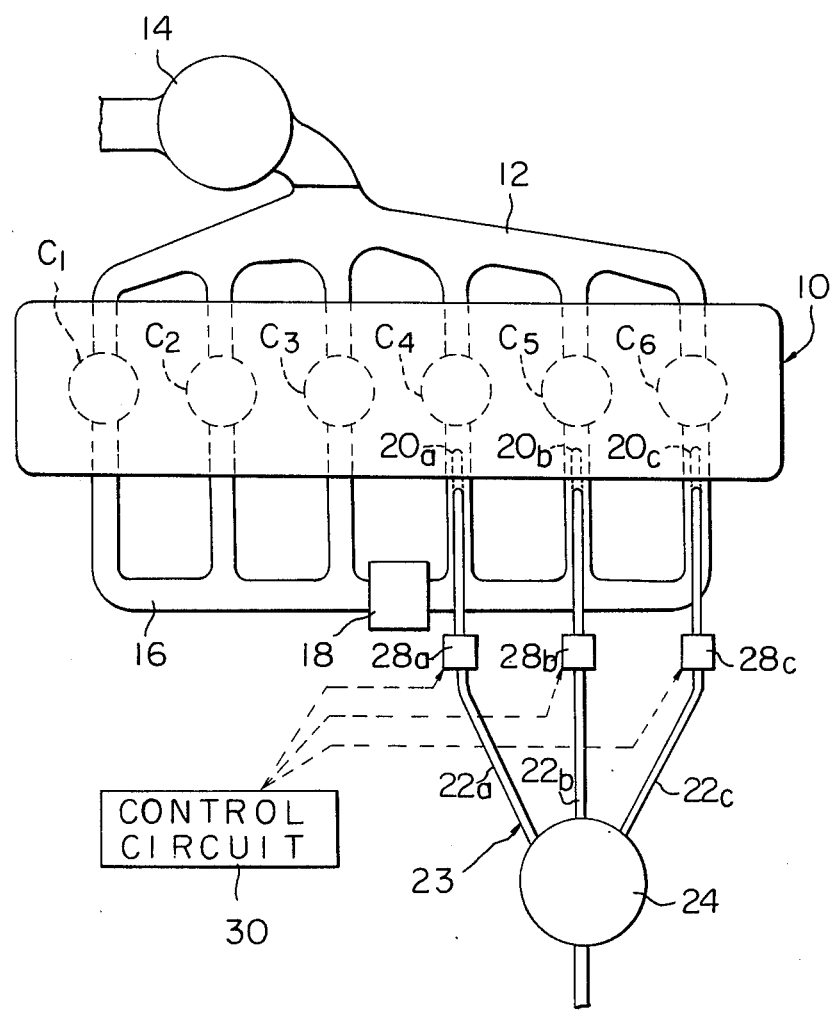
FIG. 1 is a schematic plan view of a six-cylinder internal combustion engine equipped with supplemental air feed means according to the present invention.
Figure 2:
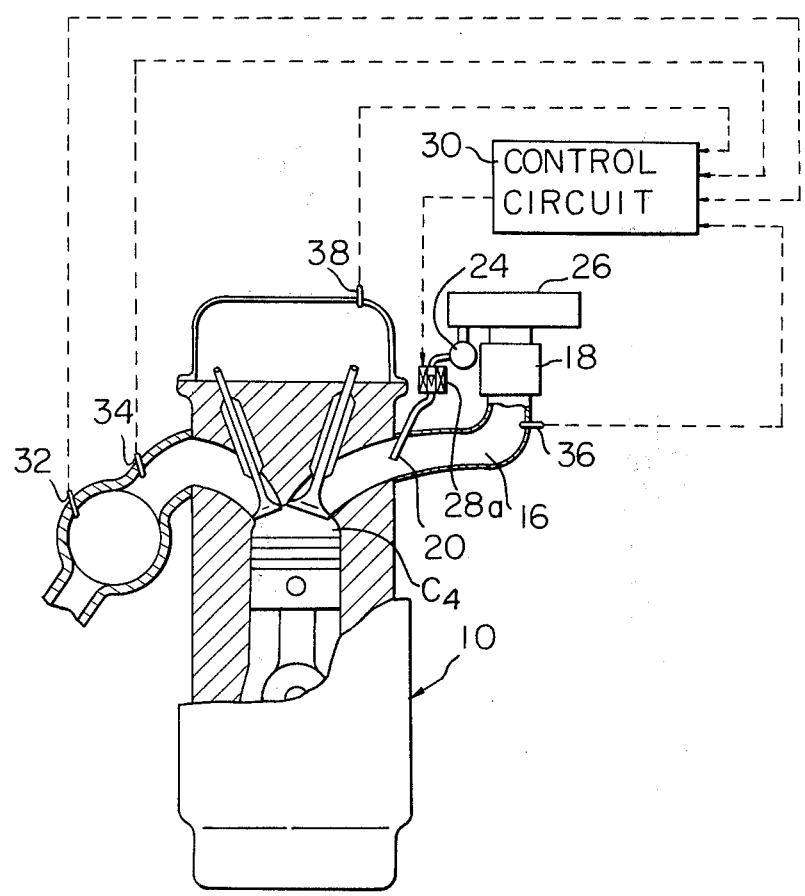
FIG. 2 is schematic section view of the engine equipped with the supplemental air feed means shown in FIG. 1.

Referring now to FIGS. 1 and 2 of the drawings, there is shown a six-cylinder internal combustion engine generally designated at numeral 10 which has a first group of three cylinders $C_1$ to $C_3$ and a second group of three cylinders $C_4$ to $C_6$. Exhaust ports (no numerals) of all the engine cylinders $C_1$ to $C_6$ communicate through an exhaust manifold 12 with a thermal reactor 14 serving as reburning means for gases discharged from the engine 10. The intake ports (no numerals) of all the engine cylinders $C_1$ to $C_6$ communicate through an intake manifold 16 with a carburetor 18 which is set to feed a first air-fuel mixture richer than the stoichiometric mixture.

Designated by reference numerals $20a$, $20b$ and $20c$ are air injection nozzles which are inserted through manifold runners (no numerals) and disposed upstream of the intake ports of the second group of engine cylinders $C_4$ to $C_6$. The air injection nozzles from part of the supplemental air feed means 23 and are connected through air conduits $22a$, $22b$ and $22c$ to an air pump 24 to feed atmospheric air drawn through an air-cleaner 26. Disposed in the air conduits $22a$, $22b$ and $22c$ are solenoid valves $28a$, $28b$ and $28c$ which are arranged to allow or block air flow therethrough when energized or de-energized by an electrical operating signal transmitted from a control circuit 30. The control circuit 30 is arranged to generate the operating signals in response to electric signals transmitted from a thermal reactor temperature sensor 32, an exhaust gas temperature sensor 34, an intake manifold vacuum sensor 36 and an engine speed sensor 38.

With the aforementioned arrangement, when the engine 10 is started, the first group of engine cylinders $C_1$ to $C_3$ are directly fed during their intake strokes with the first air-fuel mixture richer than the stoichiometric mixture from the carburetor 18. However, the first air-fuel mixture fed into the second group of engine cylinders $C_4$ and $C_6$ is diluted with supplemental air injected from the air injection nozzles $20a$, $20b$ and $20c$ to generate a second air-fuel mixture leaner than the stoichiometric mixture and therefore the second group of engine cylinders $C_4$ and $C_6$ are fed during their intake strokes with the second air-fuel mixture. Accordingly, when the ignition sequence of the six engine cylinders is $C_1$-$C_5$-$C_3$-$C_6$-$C_2$-$C_4$, the combustion sequence thereof is R-L-R-L-R-L during one engine rotation, where R indicates the first air-fuel mixture richer than the stoichiometric and L the second air-fuel mixture leaner than stoichiometric.

It will be appreciated that the air-fuel ratio of the air-fuel mixture fed into the second group of engine cylinders $C_4$ to $C_6$ is varied in response to the engine operating conditions by the means controlling the supplemental air feed, which means includes the solenoid valves $28a$, $28b$ and $28c$, the control circuit 30 and the sensors 32, 34, 36 and 38 for sensing the engine operating conditions.

It is not limited to use only the air pump 24 as means for feeding supplemental air into the second group of engine cylinders $C_4$ to $C_6$ though the air pump 24 is used in the aforementioned instance. It is possible to use air induction means instead of the air pump 24, which air induction means inducts atmospheric air only by the effect of the intake vacuum during the intake stroke of the engine cylinders. If the engine 10 has a considerable number of engine cylinders, a plurality of the means for feeding supplemental air may be provided for the engine 10.

It is understood that if the engine has cylinders in odd numbers, near half the number of the total cylinders may be supplied with the first or second air-fuel mixture.

FIG. 3 shows a pressure and vacuum responsive control valve 40 which may be used instead of the solenoid valves 28a, 28b and 28c in FIG. 2 or used with the solenoid valves in series in the air conduits 22a, 22b and 22c. The control valve 40 controls the supplemental air injected through the air injection nozzles 20a, 20b and 20c in response to intake manifold vacuum. The control of supplemental air flow by the control valve 40 is carried out as follows:

when the intake vacuum is introduced into a vacuum chamber 42 of the control valve 40, a diaphragm 44 is forced to move downwardly against the biasing force of a helical spring 46. At the same time, a needle valve 48 fixed to the diaphragm 44 closes by being seated on its seat 50 proportionally to the magnitude of the intake vacuum to regulate air flow from the air pump 24 to the air injection nozzles 20a, 20b and 20c.

As is well known in the exhaust cleaning method of the aforementioned type, it is not required during medium and high engine speed operations to feed the first air-fuel mixture richer than the stoichiometric mixture into the first group of engine cylinders and to reburn burnable toxic constituents e.g. HC and CO in the exhaust gases from the engine 10 by a thermal reactor. In this case, it is preferable to set the carburetor 18 to feed the first air-fuel mixture during low engine speeds while feeding the second air-fuel mixture leaner than the stoichiometric mixture during the engine operating at medium and high engine speeds. In addition to such setting of the carburetor 18, by feeding the supplemental air into the second group of engine cylinders only during the engine operating at low engine speeds, the engine can be operated on both richer and leaner air-fuel mixtures than the stoichiometric mixture during the engine operating range on low engine speeds while it can be operated only on leaner mixture than the stoichiometric mixture in the engine operating range of medium and high engine speeds, which is favorable for exhaust gas cleaning of the internal combustion engine.

As is apparent from the foregoing description, half the number of total cylinders of the engine can be fed with the first air-fuel mixture richer than the stoichiometric mixture while the remaining engine cylinders of the same can be fed with the second air-fuel mixture leaner than the stoichiometric mixture by diluting the first air-fuel mixture fed into the remaining cylinders with the supplemental air from supplemental air feed means including an air pump. Referring to FIG. 4 in which curves A, B and C indicate examples of the concentrations of nitrogen oxides ($NO_x$), hydrocarbons (HC) and carbon monoxide (CO), respectively, in the engine exhaust gases with respect to the air-to-fuel ratio of the air-fuel mixture fed to the engine, it will be understood that nitrogen oxides emission from the engine can be reduced by operating an engine in the above manner. Additionally, since exhaust gases containing high concentrations of hydrocarbons and carbon monoxide are introduced from half the number of total engine cylinders into the reburning means such as a thermal reactor, even exhaust gases of low concentrations of those from the remaining engine cylinders can be effectively reburned in the reburning means after mixing with the above-mentioned exhaust gases so as to eliminate burnable noxious constituents in the exhaust gases emitted into the atmosphere.

What is claimed is:

1. A method of operating a multi-cylinder internal combustion engine having first and second groups of cylinders, comprising the steps of:
   feeding a first air-fuel mixture richer than the stoichiometric mixture into all the cylinders of the engine during their intake strokes; and
   further feeding supplemental air into the second group of cylinders of the engine so that the second group of cylinders receive a second air-fuel mixture leaner than the stoichiometric mixture.

2. A method as claimed in claim 1, further comprising the step of controlling the flow of supplemental air in response to the engine operating conditions.

3. A method as claimed in claim 1, further comprising the step of feeding the first air-fuel mixture into all the engine cylinders during low engine speeds while the second air-fuel mixture thereinto during high engine speeds; and the step of feeding said supplemental air into the second group of engine cylinders only during low engine speeds.

4. A multi-cylinder internal combustion engine having first and second groups of cylinders, comprising:
   a carburetor supplying a first air-fuel mixture richer than stoichiometric air-fuel mixture into all the cylinders of the engine;
   an intake manifold connecting said carburetor to all the cylinders of the engine;
   supplemental air feed means feeding air into the second group of cylinders of the engine such that the second group of the cylinders receive a second air-fuel mixture leaner than the stoichiometric air-fuel mixture.

5. A multi-cylinder internal combustion engine as claimed in claim 4, further comprising control means controlling flow of said supplemental air in response to the engine operating conditions.

6. A multi-cylinder internal combustion engine as claimed in claim 4, in which said supplemental air feed means includes an air pump feeding air under pressure, and a plurality of air injection nozzles connected to said air pump and disposed upstream of intake ports of the second group of the engine cylinders for injecting supplemental air.

7. A multi-cylinder internal combustion engine as claimed in claim 6, in which said control means includes a plurality of solenoid valves disposed between said air pump and said air injection nozzles to allow and block air flow when energized and de-energized, respectively.

8. A multi-cylinder internal combustion engine as claimed in claim 7, further including a plurality of sensors sensing engine operating conditions and generating signals representing the conditions, and a control circuit connected to said sensors to energize and de-energize said solenoid valves in response to the signals from said sensors.

9. A multi-cylinder internal combustion engine as claimed in claim 5, in which said control means includes a plurality of vacuum responsive valves disposed between said air pump and said air injection nozzles to allow and block the air flow in response to the vacuum of said intake manifold.

* * * * *

UNITED STATES PATENT AND TRADEMARK OFFICE
CERTIFICATE OF CORRECTION

PATENT NO. : 4,006,722

DATED : February 8, 1977

INVENTOR(S) : Yoshitaka Hata et al

It is certified that error appears in the above-identified patent and that said Letters Patent are hereby corrected as shown below:

Cancel claims 1, 2, 5 and 10.
Enter claims 3 and 6 as indicated below.

3. A method of operating a multi-cylinder internal combustion engine having first and second groups of cylinders, comprising the steps of:

feeding a first air-fuel mixture richer than the stoichiometric mixture into all the cylinders of the engine during their intake strokes; and further feeding supplemental air into the second group of cylinders of the engine so that the second group of cylinders receive a second air-fuel mixture leaner than the stoichiometric mixture;

the improvement comprising the step of feeding the first air-fuel mixture into all the engine cylinders during low engine speeds while the second air-fuel mixture thereinto during high engine speeds; and the step of feeding said supplemental air into the second group of engine cylinders only during low engine speeds.

6. A multi-cylinder internal combustion engine having first and second groups of cylinders, comprising:

a carburetor supplying a first air-fuel mixture richer than stoichiometric air-fuel mixture into all the cylinders of the engine;

an intake manifold connecting said carburetor to all the cylinders of the engine;

supplemental air feed means feeding air into the second

UNITED STATES PATENT AND TRADEMARK OFFICE
CERTIFICATE OF CORRECTION

PATENT NO. : 4,006,722  (Page 2 of 2)
DATED : February 8, 1977
INVENTOR(S) : Yoshitaka Hata et al It is certified that error appears in the above-identified patent and that said Letters Patent are hereby corrected as shown below:

group of cylinders of the engine such that the second group of the cylinders receive a second air-fuel mixture leaner than the stoichiometric air-fuel mixture;

said supplemental air feed means including an air pump feeding air under pressure, and a plurality of air injection nozzles connected to said air pump and disposed upstream of intake ports of the second group of the engine cylinders for injecting supplemental air.

Make claim 9 dependent upon claim 6.

Signed and Sealed this twenty-third Day of August 1977

[SEAL]

Attest:

RUTH C. MASON
Attesting Officer

C. MARSHALL DANN
Commissioner of Patents and Trademarks

UNITED STATES PATENT AND TRADEMARK OFFICE
CERTIFICATE OF CORRECTION

PATENT NO. : 4,006,722
DATED : February 8, 1977
INVENTOR(S) : Yoshitaka Hata et al It is certified that error appears in the above-identified patent and that said Letters Patent are hereby corrected as shown below:

Cancel claims 1, 2, 5 and 4.
Enter claims 3 and 6 as indicated below.

3. A method of operating a multi-cylinder internal combustion engine having first and second groups of cylinders, comprising the steps of:

feeding a first air-fuel mixture richer than the stoichiometric mixture into all the cylinders of the engine during their intake strokes; and further feeding supplemental air into the second group of cylinders of the engine so that the second group of cylinders receive a second air-fuel mixture leaner than the stoichiometric mixture;

the improvement comprising the step of feeding the first air-fuel mixture into all the engine cylinders during low engine speeds while the second air-fuel mixture thereinto during high engine speeds; and the step of feeding said supplemental air into the second group of engine cylinders only during low engine speeds.

6. A multi-cylinder internal combustion engine having first and second groups of cylinders, comprising:

a carburetor supplying a first air-fuel mixture richer than stoichiometric air-fuel mixture into all the cylinders of the engine;

an intake manifold connecting said carburetor to all the cylinders of the engine;

supplemental air feed means feeding air into the second

UNITED STATES PATENT AND TRADEMARK OFFICE
CERTIFICATE OF CORRECTION

PATENT NO. : 4,006,722             (Page 2 of 2)

DATED : February 8, 1977

INVENTOR(S) : Yoshitaka Hata et al

It is certified that error appears in the above-identified patent and that said Letters Patent are hereby corrected as shown below:

group of cylinders of the engine such that the second group of the cylinders receive a second air-fuel mixture leaner than the stoichiometric air-fuel mixture;

said supplemental air feed means including an air pump feeding air under pressure, and a plurality of air injection nozzles connected to said air pump and disposed upstream of intake ports of the second group of the engine cylinders for injecting supplemental air.

Make claim 9 dependent upon claim 6.

This certificate supersedes Certificate of Correction issued August 23, 1977.

Signed and Sealed this

Sixth Day of June 1978

[SEAL]

Attest:

RUTH C. MASON
*Attesting Officer*

DONALD W. BANNER
*Commissioner of Patents and Trademarks*